(No Model.)

J. V. WERNER & W. FALKER.
GRASS RECEPTACLE FOR LAWN MOWERS.

No. 498,039. Patented May 23, 1893.

Witnesses
K. C. Hutchins.
T. R. Hutchins.

Inventors
John Valentine Werner
William Falker
By Thos. H. Hutchins their atty

UNITED STATES PATENT OFFICE.

JOHN VALENTINE WERNER AND WILLIAM FALKER, OF JOLIET, ILLINOIS.

GRASS-RECEPTACLE FOR LAWN-MOWERS.

SPECIFICATION forming part of Letters Patent No. 498,039, dated May 23, 1893.

Application filed June 10, 1892. Serial No. 436,213. (No model.)

*To all whom it may concern:*

Be it known that we, JOHN VALENTINE WERNER and WILLIAM FALKER, citizens of the United States of America, residing at Joliet, in the county of Will and State of Illinois, have invented certain new and useful Improvements in Grass-Receptacles for Lawn-Mowers, of which the following is a specification, reference being had therein to the accompanying drawings, and the letters of reference thereon, forming a part of this specification, in which—

Figure 1:
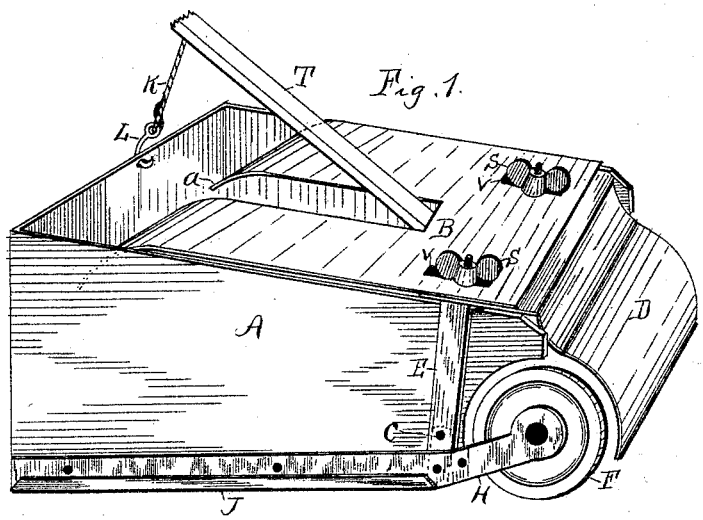
Figure 2:
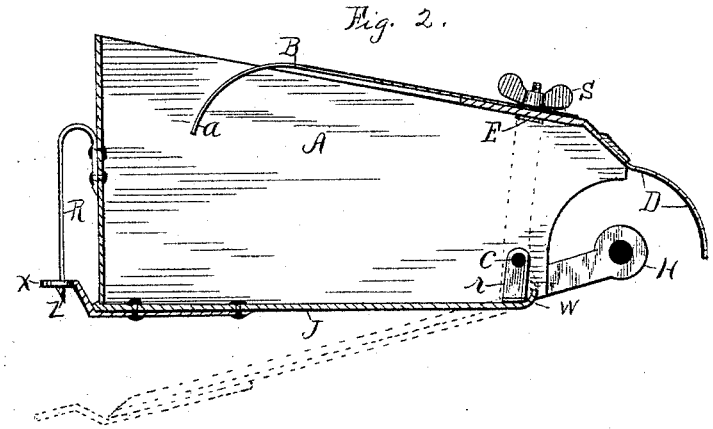

Figure 1 is a perspective view and Fig. 2 is a longitudinal section taken on line 1 of Fig. 1.

This invention relates to certain improvements in grass receptacles for lawn mowers, which improvements are fully set forth and explained in the following specification and claims, reference being had to the accompanying drawings and the letters of reference thereon making a part of this specification.

Referring to the drawings A represents the grass receptacle proper consisting of a rectangular box made preferably of sheet metal having its rear end somewhat more elevated than its forward end, and having its forward end open to receive the mower to which it may be pivotally attached by means of the forwardly extending arms H as shown in Fig. 1.

J is the bottom of the box A. and is attached at its forward end immediately at the rear of the mower to a cross bar having its ends r extending upward at right angles with the bottom J within the sides of receptacle A. and pivotally connected at c with said sides to form a hinge for the inner end of said bottom so that the outer end of said bottom may be let down as shown in broken lines in Fig. 2. to permit discharge of the grass from within the receptacle. The outer end of said bottom is provided with an extending eye plate X for the reception of the lower end of the spring latch R having a barbed point Z for catching in said eye and holding the bottom J in proper position as shown.

When the receptacle is full and it is desired to discharge its contents, the operator may press the lower end of said latch forward with his toe so as to cause it to uncatch from the eye X and let the bottom J drop as shown in the broken lines. A slight raise of the handle of the mower will give sufficient incline to said bottom, so that it will permit the contents of the receptacle to be discharged, and when the handle of the mower is depressed it will cause said latch to again enter said eye and close the receptacle as shown in Fig. 1. The inner end of said bottom is curved upward as shown at W for the purpose of preventing the contents of the receptacle from sliding forward against the knives of the mower.

The top of the receptacle is provided with a pair of covers B and D for the purpose of preventing the cut grass from flying out of the receptacle. These covers are supported on the cross-bar E having the thumb screws and nuts S, the thumb screws passing up through longitudinal slots V in said covers, so as to furnish means for adjusting and holding adjusted the said covers to adjust them to the form of the machine to which the receptacle may be applied. The forward end of the cover D is curved downward so as to cover the forward part of the machine and prevent grass from flying out forward of the machine. The cover B. is curved downward at its rear end for the purpose of preventing the grass from flying out over the rear end of the receptacle, and is provided with a slot at $a$ for the reception of the handle T. of the mower, and for furnishing means for the adjustment of said cover.

The rear end of the receptacle is connected with the handle T of the mower by means of the cord K and hook L in the ordinary manner.

The principal new features of this invention are the falling bottom for discharging the contents of the receptacle, and in the adjustable covers having their ends curved downward for the purpose specified, the whole forming a very neat, effective and durable device for the purpose.

Having thus described our invention, what we claim as new, and desire to secure by Letters Patent, is as follows, to wit:

1. In a grass receptacle for a lawn mower the combination of the box A having its forward end open and provided with the arms H for attaching it to a lawn mower, the bottom J having its forward end pivotally connected to said receptacle, and having a latch at its rear end for detachably connecting it with the receptacle, the cover B having its rear end curved downward, and having the slots $a$ and $v$, the cover D having its forward end curved downward and having slots $v$, the thumb screws and nuts S for adjustably securing said slides to the receptacle and the cord and hook K. L. for connecting the rear part of the receptacle with the mower handle substantially as and for the purpose set forth.

2. In a grass receptacle for lawn mowers the combination of the body A. cover B having its rear end curved downward and having the slot $a$, the cover D having the forward end curved downward and having the adjusting slots $v. v.$ the cross bar E and the thumb nuts S and their bolts all arranged to operate substantially as and for the purpose set forth.

JOHN VALENTINE WERNER.
WILLIAM FALKER.

Witnesses:
THOS. H. HUTCHINS,
RAY HUTCHINS.